United States Patent
Lu et al.

(10) Patent No.: US 10,149,339 B2
(45) Date of Patent: *Dec. 4, 2018

(54) BASE STATION, USER EQUIPMENT AND METHODS FOR RANDOM ACCESS

(71) Applicant: Telefonaktiebolaget LM Ericsson (publ), Stockholm (SE)

(72) Inventors: Qianxi Lu, Beijing (CN); Qingyu Miao, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/701,235

(22) Filed: Sep. 11, 2017

(65) Prior Publication Data

US 2017/0374702 A1 Dec. 28, 2017

Related U.S. Application Data

(63) Continuation of application No. 14/651,501, filed as application No. PCT/SE2012/051382 on Dec. 12, 2012, now Pat. No. 9,794,972.

(51) Int. Cl.
*H04W 76/14* (2018.01)
*H04W 72/04* (2009.01)
(Continued)

(52) U.S. Cl.
CPC ......... *H04W 76/14* (2018.02); *H04W 72/042* (2013.01); *H04W 74/006* (2013.01); *H04W 74/0833* (2013.01); *H04W 92/18* (2013.01)

(58) Field of Classification Search
None
See application file for complete search history.

(56) References Cited

U.S. PATENT DOCUMENTS 9,794,972 B2 * 10/2017 Lu .................. H04W 76/023
2006/0160544 A1 * 7/2006 Sun .................. H04W 8/18
455/456.1

(Continued)

FOREIGN PATENT DOCUMENTS

CN 101946424 A 1/2011
CN 102202345 A 9/2011
(Continued)

OTHER PUBLICATIONS

Second Office Action from foreign counterpart Chinese Patent Application No. 201610901976.5, dated Oct. 17, 2017, 4 pages.
(Continued)

*Primary Examiner* — Phirin Sam
*Assistant Examiner* — Faiyazkhan Ghafoerkhan
(74) *Attorney, Agent, or Firm* — Nicholson de Vos Webster & Elliott, LLP

(57) ABSTRACT

According to a first aspect of embodiments herein, the object is achieved by a method in a base station for handling a Random Access Channel (RACH) procedure in a mixed cellular and device to device (D2D) network. The base station receives from a first user equipment in a RACH message, an indication that the RACH relates to D2D communication. The base station then schedules a D2D link to the first user equipment based on the indication.

20 Claims, 7 Drawing Sheets

(51) Int. Cl.
 *H04W 74/08* (2009.01)
 *H04W 92/18* (2009.01)
 *H04W 74/00* (2009.01)

(56) References Cited

U.S. PATENT DOCUMENTS

| | | | | |
|---|---|---|---|---|
| 2009/0213818 | A1* | 8/2009 | Park | H04W 74/0833 370/336 |
| 2010/0268775 | A1* | 10/2010 | Doppler | H04W 4/00 709/204 |
| 2011/0300858 | A1* | 12/2011 | Lee | H04W 8/24 455/425 |
| 2012/0077510 | A1* | 3/2012 | Chen | H04W 28/26 455/452.1 |
| 2012/0083283 | A1* | 4/2012 | Phan | H04W 72/048 455/450 |
| 2012/0163311 | A1* | 6/2012 | Park | H04W 72/1294 370/329 |
| 2012/0275438 | A1* | 11/2012 | Dai | H04W 72/1289 370/336 |
| 2012/0281600 | A1* | 11/2012 | Tseng | H04L 5/0007 370/280 |
| 2012/0281679 | A1* | 11/2012 | Fan | H04W 74/008 370/336 |
| 2012/0294269 | A1* | 11/2012 | Yamada | H04L 1/1864 370/329 |
| 2013/0034059 | A1* | 2/2013 | Lee | H04W 74/006 370/328 |
| 2013/0058301 | A1* | 3/2013 | Lee | H04L 1/1877 370/329 |
| 2013/0064103 | A1* | 3/2013 | Koskela | H04W 72/1284 370/252 |
| 2013/0142268 | A1* | 6/2013 | Gao | H04W 76/14 375/252 |
| 2013/0157670 | A1* | 6/2013 | Koskela | H04W 76/14 455/450 |
| 2013/0250798 | A1 | 9/2013 | Iwamura et al. | |
| 2013/0258996 | A1* | 10/2013 | Jung | H04W 72/1284 370/330 |
| 2014/0003319 | A1* | 1/2014 | Etemad | H04W 28/08 370/312 |
| 2014/0010172 | A1* | 1/2014 | Wei | H04W 76/14 370/329 |
| 2014/0064203 | A1* | 3/2014 | Seo | H04W 28/06 370/329 |
| 2014/0079011 | A1* | 3/2014 | Wiberg | H04W 74/006 370/329 |
| 2014/0086176 | A1* | 3/2014 | Liu | H04W 74/006 370/329 |
| 2014/0112194 | A1* | 4/2014 | Novlan | H04W 48/16 370/254 |
| 2014/0153390 | A1* | 6/2014 | Ishii | H04W 28/0289 370/230 |
| 2015/0111587 | A1* | 4/2015 | Kalhan | H04W 76/023 455/450 |
| 2015/0334756 | A1* | 11/2015 | Lu | H04W 76/023 370/329 |
| 2017/0374702 | A1* | 12/2017 | Lu | H04W 76/023 |

FOREIGN PATENT DOCUMENTS

| | | |
|---|---|---|
| CN | 102638866 A | 8/2012 |
| CN | 102754485 A | 10/2012 |
| GB | 2489690 A | 10/2012 |
| JP | 2006523404 A | 10/2006 |
| JP | 2012119827 A | 6/2012 |
| WO | 2011100540 A1 | 8/2011 |
| WO | 2012019348 A1 | 2/2012 |
| WO | 2012052911 A1 | 4/2012 |
| WO | 2014032222 A1 | 3/2014 |
| WO | 2014092612 A1 | 6/2014 |

OTHER PUBLICATIONS

Second Office Action and Search Report from foreign counterpart Chinese Patent Application No. 201280077641.6, dated Oct. 23, 2017, 8 pages.
3GPP TS 36.321 V12.5.0: "Evolved Universal Terrestrial Radio Access (E-UTRA); Medium Access Control (MAC) protocol specification," 3rd Generation Partnership Project; Technical Specification Group Radio Access Network; Release 12, Mar. 2015, 77 pages.
Extended European Search Report for Application No. 16187519.0, dated Apr. 12, 2017, 5 pages.
Final Office Action from U.S. Appl. No. 14/651,501, dated Jan. 20, 2017, 18 pages.
First Office Action and Search Report from foreign counterpart Chinese Application No. 2012800776416, dated Apr. 5, 2016, 13 pages.
First Office Action and Search report from foreign counterpart Chinese Patent Application No. 201610901976.5, dated Jul. 19, 2017, 14 pages.
Intention to Grant for European Application No. 12818655.8, dated Jul. 11, 2016, 40 pages.
International Preliminary Report on Patentability for Application No. PCT/SE2012/051382, dated Jan. 29, 2015, 6 pages.
International Search Report and Written Opinion for Application No. PCT/SE2012/051382, dated Nov. 7, 2013, 8 pages.
Non-Final Office Action from U.S. Appl. No. 14/651,501, dated Sep. 22, 2016, 26 pages.
Notice of Allowance from U.S. Appl. No. 14/651,501, dated Jun. 12, 2017, 16 pages.
Notice of Ground for Rejection from foreign counterpart Japanese Application No. 2015547889, dated May 9, 2016, 5 pages.
Office Action from foreign counterpart Japanese Patent Application No. 2015547889, dated Jan. 6, 2017, 3 pages.
Notice of Allowance from U.S. Appl. No. 14/651,501, dated Aug. 10, 2017, 6 pages.
Substantive Examination Report for Application No. 1/2015/500959, dated Apr. 10, 2018, 6 pages.

* cited by examiner

BASE STATION, USER EQUIPMENT AND METHODS FOR RANDOM ACCESS

CROSS-REFERENCE TO RELATED APPLICATIONS

This application is a continuation of U.S. application Ser. No. 14/651,501, filed Jun. 11, 2015, which is the National stage of International Application No. PCT/SE2012/051382, filed Dec. 12, 2012 which are hereby incorporated by reference.

TECHNICAL FIELD

Embodiments herein relate to a base station, a user equipment and methods therein. In particular, it relates to handling a Random Access Channel (RACH) procedure in a mixed cellular and Device to Device (D2D) network.

BACKGROUND

Communication devices such as terminals are also known as e.g. User Equipments (UE), mobile terminals, wireless terminals and/or mobile stations. Terminals are enabled to communicate wirelessly in a cellular communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by a base station, e.g. a Radio Base Station (RBS), which sometimes may be referred to as e.g. "eNB", "eNodeB", "NodeB", "B node", Base Transceiver Station (BTS), or AP (Access Point), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for terminals. The 3GPP has undertaken to evolve further the UTRAN and GSM based radio access network technologies.

3GPP LTE radio access standard has been written in order to support high bitrates and low latency both for uplink and downlink traffic. All data transmission is in LTE controlled by the radio base station.

D2D Communication

Recent developments of the 3GPP Long Term Evolution (LTE) facilitate accessing local IP based services in a home, an office, a public hot spot or even outdoor environments. One of the important use cases for a local IP access and local connectivity involves the direct communication between wireless devices such as user equipments in the close proximity of each other, typically less than a few 10s of meters but sometimes up to a few hundred meters.

This direct mode or D2D enables a number of potential gains over the traditional cellular technique where two devices communicates vi a cellular access point such as e.g. a base station because D2D devices are often much closer to one another than the cellular devices that have to communicate via the cellular access point.

One gain is capacity gain which may comprise reuse gain and hop gain. Regarding the reuse gain, D2D communication may provide reuse of radio resources such as e.g. Orthogonal Frequency Division Multiplex (OFDM) resource blocks, reuse gain. Regarding the hop gain, D2D communication provides a D2D link providing a single hop between the transmitter and receiver points as opposed to the 2-hop link via a cellular access point.

Another gain is maximum achievable rate gain, which may comprise proximity gain. D2D communication may further provide high peak rates due to the proximity and potentially favorable propagation.

A further gain is latency gain. When the UEs communicate over a D2D link, base station forwarding is short cut and the end-to-end latency can decrease.

Random Access Procedure in Cellular Networks

MSG1.

A user equipment that has new data to transmit and therefore requires resources sends a first message to the base station. The first message may also be referred to as MSG1, a preamble, or a Random Access Channel (RACH) preamble. MSG is an abbreviation for MeSsaGe. In the first message the user equipment provides an indication to the network about its resource requirement. The first message comprises a preamble Identity (ID). After the user equipment has transmitted its preamble, it waits for a Random Access Response (RAR) associated with its RA-RNTI to see if the base station heard the preamble. The RA-RNTI comprises the subframe number the user equipment transmitted in +1.

MSG2.

When the base station hears the preamble, it responds to the preamble by transmitting a second message, also referred to as MSG2 or RAR, to the user equipment. The second message comprises information about Timing Advanced (TA), Preamble ID and Temporary Cell Radio Network Temporary Identifier, (TC-RNTI). TC-RNTI is a number generated by the base station used as the identity of the user equipment within the cell.

MSG3.

If the user equipment finds a suitable RAR, then it looks to see if its specific preamble identity is included. If so, then the user equipment assumes it received a positive acknowledge from the base station, and the user equipment uses the TC-RNTI for subsequent signalling to the base station. When the user equipment has assumed that it received a positive acknowledge from the base station, the user equipment sends an RRC connection request (not always included, e.g., when the user equipment is in RRC connected mode, it may just use RACH to request resource grant) and a Buffer Status Report (BSR) Control Element (CE) in a third message, also referred to as MSG3 using resources given by the base station. The Buffer Status Report (BSR) Control Element (CE) indicated the amount of new data to be transmitted. It also sends the identifier such as a Temporary Mobile Subscriber Identity (TMSI), to the base station which is used to resolve the Contention, i.e. if other user equipments uses the same RACH. Please note that the RA-RNTI is determined from the user equipments preamble transmission, the temporary C-RNTI is assigned by the base station.

MSG4.

The base station sends a Physical Downlink Control Channel (PDCCH) UL grant or a DL assignment to the user equipment, addressed to the C-RNTI of the user equipment, in a fourth message also referred to as MSG4. In this step, the user equipment, which has received the C-RNTI, continues to set up an RRC connection. However, the RACH may be also used for RRC connected user equipments. If other user equipments used the same RACH, they will try again to send a preamble.

According to a current LTE protocol, in a traditional RACH procedure for cellular user equipments, the user equipment maintains a window also referred to as ResponseWindowSize, for the reception of MSG2, and timer, also referred to as Medium Access Control (MAC)-ContentionResolutionTimer for the reception of MSG4. The possible value of the window is from 2 sub frames to 10 subframes, and the value of the timer is from 8 subframes to 64 subframes. When the window is active, the user equipment would have to keep monitoring Physical Downlink Control Channel (PDCCH) for possible MSG2 on DL. When the timer is active, the user equipment would have to keep monitoring PDCCH for possible MSG4 on DL. If no grant is received within the window or timer, this RACH attempt fails.

In a mixed cellular and D2D network, the addressed RACH procedure is limited to being triggered by new data at the user equipment, i.e., UL data to send to the base station or D2D data to send to the counterpart, where the user equipment is out-of-sync but still RRC connected. Here the out-of-sync means that the UL synchronization to the base station is lost. In the current RACH procedure, receiving a C-RNTI and a BSR CE in UL MSG3, makes the base station aware of the identity of the user equipment that performs the RACH procedure and that it has data to send on UL. The base station then schedules the user equipment on a Physical Uplink Shared CHannel (PDCCH) for UL data transmission, so when the user equipment receives PDCCH UL grant addressed to its C-RNTI, i.e., MSG4, the RACH procedure is seen as successful, and the ContentionResolutionTimer is stopped. However, for a RACH triggered by D2D data, a base station receiving C-RNTI and BSR in MSG3, is blind to whether it is due to cellular or D2D data, and still schedule the user equipment in a cellular UL link, even though, what the user equipment really want is the scheduling of a D2D link.

SUMMARY

It is therefore an object of embodiments herein to provide a way of improving the performance in a mixed cellular and D2D network.

According to a first aspect of embodiments herein, the object is achieved by a method in a base station for handling a Random Access Channel, RACH, procedure in a mixed cellular and D2D network. The base station receives from a first user equipment in a RACH message, an indication that the RACH relates to D2D communication. The base station then schedules a D2D link to the first user equipment based on the indication.

According to a second aspect of embodiments herein, the object is achieved by a method in a first user equipment for handling a Random Access Channel, RACH, procedure in a mixed cellular and D2D network. The first user equipment sends to a base station within the mixed cellular and D2D network, in a RACH message, an indication that the RACH relates to D2D communication. The first user equipment receives information about a scheduled D2D link from the base station. The D2D link has been scheduled to the first user equipment based on the indication.

According to a third aspect of embodiments herein, the object is achieved by a base station for handling a Random Access Channel, RACH, procedure in a mixed cellular and D2D network. The base station comprises a receiving unit configured to receive from a first user equipment, in a RACH message an indication that the RACH relates to D2D communication. The base station further comprises a scheduler configured to schedule a D2D link to the first user equipment based on the indication.

According to a fourth aspect of embodiments herein, the object is achieved by a first user equipment for handling a Random Access Channel, RACH, procedure in a mixed cellular and D2D network. The first user equipment comprises a sending unit configured to send to a base station within the mixed cellular and D2D network, in a RACH message, an indication that the RACH relates to D2D communication. The first user equipment further comprises a receiving unit configured to receive information about a scheduled D2D link from the base station. The D2D link has been scheduled to the first user equipment based on the indication.

The base station receives an indication that the RACH relates to D2D communication from the first user equipment. The base station then knows that the RACH relates to D2D and not cellular communication, and can therefore schedules a D2D link to the first user equipment instead of an unnecessary cellular link. In this way the performance of the in the mixed cellular and D2D network has been improved.

BRIEF DESCRIPTION OF THE DRAWINGS

Examples of embodiments herein are described in more detail with reference to attached drawings in which.

DETAILED DESCRIPTION

Figure 1:
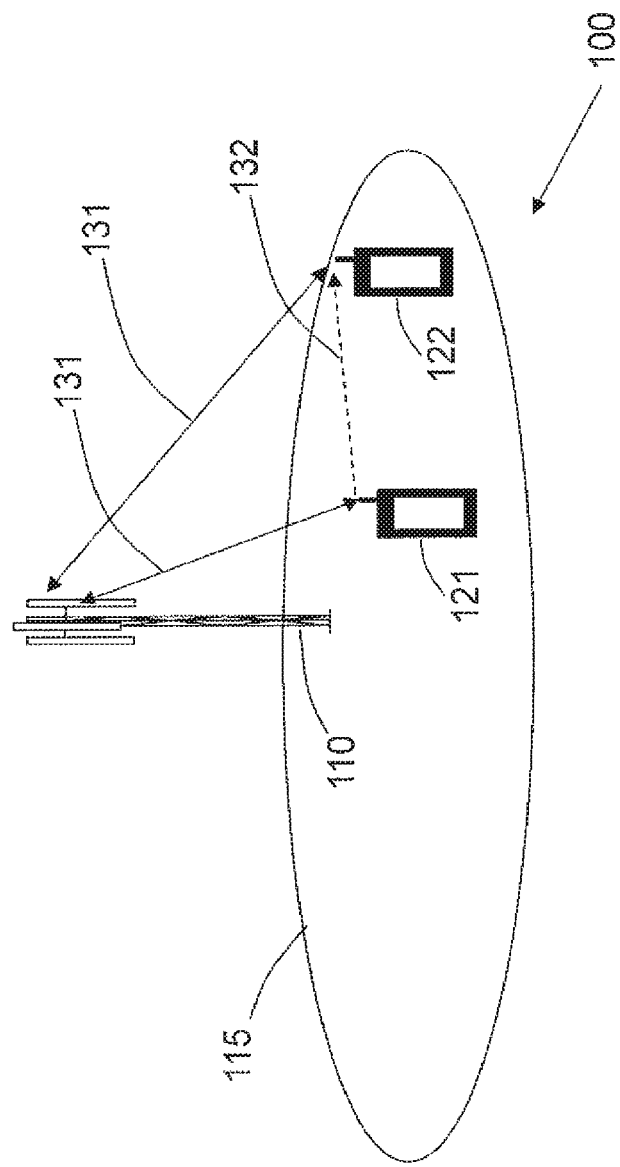
FIG. 1 is a schematic block diagram illustrating embodiments in a cellular network.

As part of developing embodiments herein, a problem will first be identified and discussed. As mentioned above, there is a need to differentiate a cellular RACH and a D2D RACH relating to a user equipment, so that the base station knows what to schedule for the use equipment. Besides the scheduling behavior, furthermore, there is a need for the base station to improve different RACH response performance for cellular and D2D communication, e.g., to provide different Quality of Experience (QoE).

The user equipment need to monitor MSG4 in a D2D RACH in a suitable way, therefore a way to perform this is required. In a current cellular network, if RACH is triggered by UL data of an out-of-sync user equipment, MSG4 is defined as an UL grant, i.e., the ContentionResolutionTimer would only be stopped when a new UL grant is received for the user equipment's C-RNTI. In a mixed cellular and D2D network scenario, for the RACH procedure of D2D transmission, the D2D resource allocation information has to reach both D2D user equipments at the same time, to ensure that both transmission and reception is ready for D2D connection. For two D2D user equipments in a D2D link, when there is RACH triggered by new D2D data to send at a first user equipment, the first user equipment does not know the current state of the other user equipment. The other user equipment is also referred to as a second user equipment. E.g., the second user equipment may be in different states such as still be in-synchronization due to continuous cellular link activity, or also out-of-synchronization similarly, or has already been released by the network to an idle state.

UL synchronization with network enables that reception timing of a user equipment transmission at the base station side aligns with the timing of the base station.

The first user equipment has to monitor PDCCH continuously for in-sync user equipments, the RACH user equipment, i.e. the first user equipment has to wait for a Discontinuous Reception (DRX) cycle at most to receive the resource grant, i.e. MSG4.

Further, the first user equipment has to monitor PDCCH continuously for out-of-sync user equipments, the RACH user equipment, i.e. the first user equipment has to wait for at least the procedure of network-initiated RACH procedure to synchronize to the second user equipment.

Further, the first user equipment has to monitor PDCCH continuously for idle user equipments, the RACH user equipment, i.e. the first user equipment has to wait for the procedure of network-initiated RRC connection re-establishment to synchronize the second user equipment. Hence, in order to wait for a DRX cycle of the second user equipment which may be as long as 320 ms, which is larger than the maximum length of a ContentionResolutionTimer being 64 ms, as in the best case of for in-sync user equipments, it would cause user equipment power waste in RACH procedure. So the first user equipment need to monitor the MSG4 in a more power efficient way.

Embodiments herein provide a way of designing the RACH procedure for D2D communication.

According to embodiments herein, a RACH procedure is provided to differentiate cellular and D2D buffer explicitly or implicitly. Embodiments herein e.g. comprises separated preamble/PRACH locations within a frame of a RACH resource for MSG1, or new RNTI and/or BSR definition in MSG3.

Embodiments herein may further comprise that any PDCCH addressed to the user equipment's RNTI such as C-RNTI or D2D-RNTI, may be seen as MSG4.

FIG. 1 depicts a mixed cellular and D2D network 100 in which embodiments herein may be implemented. The mixed cellular and D2D network 100 comprises a cellular communications network and a D2D communications network. The cellular communications network is a wireless communication network such as an LTE, WCDMA, GSM network, any 3GPP cellular network, Wimax, or any cellular network or system. The D2D communications network is a direct communication between wireless devices such as user equipments in the close proximity of each other, such as e.g. in a range of tens to hundreds of meters.

The mixed cellular and D2D network 100 comprises a plurality of base stations whereof one, a base station 110 is depicted in FIG. 1. The base station 110 may be a radio base station such as e.g. an eNB, an eNodeB, or an Home Node B, an Home eNode B or any other network node capable to serve a user equipment or a machine type communication device in a cellular communications network. The base station 110 is serving a cell 115.

A number of user equipments are located in the cell 115 served by the base station 110. In the example scenario of FIG. 1, only two user equipments are shown in the cell 115, a first user equipment 121 and a second user equipment 122. The first user equipment 121 and the second user equipment 122 are capable of communicating with each other using D2D communication. The first user equipment 121 and the second user equipment 122 are further capable of accessing the cellular communications network within the mixed cellular and D2D network 100 via the base station 110 when they are located in the cell 115. The first user equipment 121 and the second user equipment 122 may e.g. be mobile terminals or wireless terminals, mobile phones, computers such as e.g. laptops, Personal Digital Assistants (PDAs) or tablet computers, sometimes referred to as surf plates, with wireless capability, or any other radio network units capable to communicate over a radio link 131 in the cellular communications network or a D2D link 132 in the D2D communications network.

Example of embodiments of a method for handling a RACH procedure in a mixed cellular and D2D network will now be described with reference to a combined flowchart and signalling diagram depicted in FIG. 2. Below, embodiments of the method when seen from the base station 110 view (FIG. 3) and embodiments of a method when seen from the first user equipment 121 view (FIG. 5) will be described.

The method comprises the following actions, which actions may be taken in any suitable order.

Action 201

This is an optional action. The base station 110 may send information to user equipments including the first user equipment 121 and possibly the second user equipment served by the base station 110. The information comprises that RACH preambles to be used for D2D communication and RACH preambles to be used for cellular communication are divided. This is for the base station 110 to be able to recognize whether a RACH preamble refers to a cellular or D2D communication. This information may e.g. be broadcasted.

The RACH preambles may be divided into different groups, one or more groups of RACH preambles relating to D2D communication and one or more groups of RACH preambles relating to cellular communication. As an alternative, the RACH resources may be divided into different time and/or frequency locations within a frame of a RACH resource, one or more time and/or frequency locations for RACH associated with D2D communication, and one or more time and/or frequency locations for RACH associated to cellular communication. This will be further discussed below.

Action 202

In an example scenario the first user equipment 121 has a buffer of data that it requires to send to the second user equipment 122. Since the first user equipment 121 is in the vicinity of the second user equipment 122, it seeks to set up a D2D link 132 to send the buffer of data. Therefore the first user equipment 121 sends a RACH message to the base station 110. According to embodiments herein, the RACH message comprises an indication that the RACH relates to D2D communication. This tells the base station 110 that the first user equipment requests resources to be scheduled for D2D communication.

The RACH message may be a RACH preamble sent in a RACH resource location, i.e. MSG1 in the RACH procedure.

In some embodiments, the indication may be a specific D2D RNTI and may be comprised in MSG3 in the RACH procedure. The specific D2D RNTI is common for transmission and reception on the D2D link. This is an advantage since it lets the base station 110 know which user equipment is the counterpart of the D2D link In some embodiments, the first user equipment 121 has received the information about the RACH preambles to be used for D2D communication and the RACH preambles to be used for cellular communication are divided. In these embodiments, the indication sent to and received by the base station 110 may be a RACH preamble comprised in a group of RACH preambles relating to D2D communication or a RACH preamble received at a specific time and/or frequency locations within a frame of a RACH resource, which a specific time and/or frequency locations are related to D2D communication. This will be further described below.

In some embodiments the indication is a Buffer Status Report (BSR) comprising a format related to D2D communication. This may be comprised in MSG3 in the RACH procedure. Also this will be further described below.

Action 203

The base station 110 has received the RACH message comprising the indication of D2D communication. It thus knows that the RACH message relates to D2D communication and therefore schedules a D2D link to the first user equipment 121 based on the indication. In this way the scheduling of an unnecessary cellular link is avoided.

Action 204

This is an optional action, performed in some embodiments. Since the D2D link is for D2D communication between the first user equipment 121 and the second user equipment 122, the base station 110 may send information in a RACH message on PDCCH to the first user equipment 121 and the second user equipment 122 at the same time using the same RACH message. This information comprises the scheduled D2D link associated with the specific D2D RNTI and may be a PDCCH message related to MSG4 in the RACH procedure.

In some embodiments, the first user equipment 121 may have an active time resolution timer. In this timer the first user equipment 121 monitors any response such as a grant for its requested resources for D2D communication. The active time resolution timer may in some embodiments be stopped by the first user equipment upon receiving the RACH message comprising the scheduled D2D link associated with the specific D2D RNTI.

However, in some cases there may not be a specific grant message sent to the first user equipment 121. This may e.g. be because the length of the timer is not enough for the base station 110 to send out a grant to both the first user equipment 121 and the second user equipment 122 in the D2D pair, since the second user equipment 122 is not ready for receiving grant and it takes more time for the network to wake up the second user equipment 122. Therefore, in some embodiments the base station 110 may send any PDCCH message to the first user equipment 121. When this PDCCH message is addressing an RNTI such as e.g. such as a C-RNTI or D2D-RNTI of the first user equipment 121 it will be interpreted as an indication to the first user equipment 121 to stop the active time resolution timer in the first user equipment 121. E.g. it may be interpreted as a scheduling grant such as MSG4 by the first user equipment 121.

Action 205

This is an optional action, performed in some embodiments. In this action the first user equipment 121 stops the active time resolution timer according to the action above.

Action 206

The D2D communication is then set up between the first user equipment and the second user equipment 122 using the scheduled D2D link 132.

Embodiments of a Method Seen from a Base Station 110 Perspective

Example of embodiments of a method in the base station 110 for handling Random Access Channel, RACH, procedure in a mixed cellular and D2D network 100, will now be described with reference to a flowchart depicted in FIG. 3. The method comprises the following actions, which actions may be taken in any suitable order. Dashed lines of some boxes in FIG. 3 indicate that this action is not mandatory.

Action 301

This is an optional action. In some embodiments, the base station 110 sends information to user equipments served by the base station 110. The user equipments e.g. comprises the first user equipment 121 and in some embodiments the second user equipment. The information comprises that RACH preambles to be used for D2D communication and RACH preambles to be used for cellular communication are divided. In some embodiments the RACH preambles are divided into different groups, a group of RACH preambles relating to D2D communication and a group of RACH preambles relating to cellular communication. As an alternative or combined, the RACH preambles are divided into different time and/or frequency locations within a frame of a RACH resource, a time and/or frequency location for RACH associated with D2D communication, and a time and/or frequency location for RACH associated to cellular communication. For example, there are multiple RACH resource locations within a frame, and specific resource location(s) may be pre-defined as D2D-specific, i.e., if the RACH MSG1 is sent on these locations, then it is for D2D RACH. This means that when the preamble is received at a specific time and/or frequency location associated with D2D communication, the base station 110 will know that this is a D2D preamble, and when the preamble is received at a specific time and/or frequency location associated with cellular communication, the base station 110 will know that this is a cellular preamble.

This action corresponds to action 201 above.

Action 302

The base station 110 receives a RACH message from the first user equipment 121. The RACH message comprises an indication that the RACH relates to D2D communication.

The RACH procedure is in this way improved by differentiating cellular and D2D data buffers to be sent from the first user equipment to the second user equipment 122. To differentiate cellular or D2D triggered RACH, this indication may be received from the first user equipment 121 explicit or implicitly, e.g. by MSG1 or MSG3.

The RACH message may e.g. be a RACH preamble, or a resource request, which may be comprised in MSG1 or MSG3 in the RACH procedure.

In some embodiments the indication is a specific D2D RNTI. The specific D2D RNTI is common for transmission and reception on the D2D link. A new definition of RNTI may be applied for D2D communication, e.g., D2D-RNTI. This RNTI is common for D2D transmission and/or reception (Tx/Rx), such that the DL information addressed to the D2D-RNTI would be received by both the first user equipment 121 and the second user equipment 122 on a specific D2D link, e.g., as scheduling information on PDCCH and RRC configuration information on PDSCH for the D2D link. Since RNTI is allocated to the first user equipment 121 and the second user equipment 122 by e.g. the base station 110 in the mixed cellular and D2D network 100, the base station 110 will know that it is a cellular or D2D triggered RACH when it receives this specific D2D RNTI. This embodiment with a specific D2D RNTI may be extended to a multi-hop D2D scenario, i.e., one D2D-capable user equipment such as the first user equipment 121, can communicate with multiple user equipments in D2D mode, which multiple user equipments are differentiated by different D2D-RNTIs.

In some other embodiments the indication is a RACH preamble comprised in a group of RACH preambles relating to D2D communication. Separated preamble groups may be defined for cellular RACH and D2D RACH. At the base station 110, by detecting preambles in different groups, the base station will know whether it is a cellular RACH or a D2D RACH. The preamble division may be broadcasted in the mixed cellular and D2D network 100 in beforehand, e.g. by the base station 110 in action 301 above. This may be broadcasted such as e.g. in a System Information Block (SIB), which is broadcasted in the system periodically to all user equipments in the cell coverage. This preamble division may be adjusted depending on the RACH load of cellular and D2D user equipments respectively such as e.g., when the ratio of cellular RACH load to D2D RACH load is x:y, then the preamble division for cellular and D2D RACH should be also x:y.

In some other embodiments the indication is a RACH preamble received at a specific time and/or frequency location within a frame of a RACH resource, related to D2D communication. By using separated RACH time and/or frequency locations, the first user equipment 121 would limit its RACH attempts in different time locations of a frame, to differentiate cellular and D2D communication. Similarly, this PRACH location division may be broadcasted in the network and may be adjusted based on user equipment load.

The indication may further be a BSR comprising a format related to D2D communication, which e.g. may be comprised in MSG3 in the RACH procedure.

A specific definition of BSR for D2D may apply a format different from cellular BSR. This may be performed by defining a new Logical Channel Identity (LCID) for a new Medium Access Control (MAC) Control Element (CE) to carry this specific D2D BSR. Therefore, by receiving this new BSR, the base station will know whether it is a cellular or D2D triggered RACH.

This action corresponds to action 202 above.

Action 303

The base station 110 schedules a D2D link to the first user equipment 121 based on the indication.

This action corresponds to action 203 above.

Action 304

As mentioned above, the D2D link is for D2D communication between the first user equipment 121 and the second user equipment 122. The base station 110 may send information to the first user equipment 121 and the second user equipment 122 in a RACH message. The information comprises the scheduled D2D link associated with the specific D2D RNTI.

This action corresponds to action 204 above.

According to prior art, since the scheduling information delivery e.g. Downlink Control Information (DCI) of the RACH procedure may follow DRX timing of both D2D transmission and D2D reception, so PDCCH monitoring on DRX-sleep intervals are meaningless, i.e., the traditional MSG4 definition in this case is too limited. To overcome this problem, the base station 110 may according to some embodiments, send any PDCCH message to the first user equipment 121. This PDCCH message will when addressing an RNTI of the first user equipment 121, be interpreted as an indication to the first user equipment 121 to stop an active time resolution timer in the first user equipment 121. Thus, according to this embodiment, the first user equipment may interpret this PDCCH message as a MSG4. This means that any PDCCH addressed to the first user equipment's RNTI may be seen as MSG4. This is shown in FIG. 4 which depicts MSG4 monitoring behavior according to embodiments herein.

Figure 4:
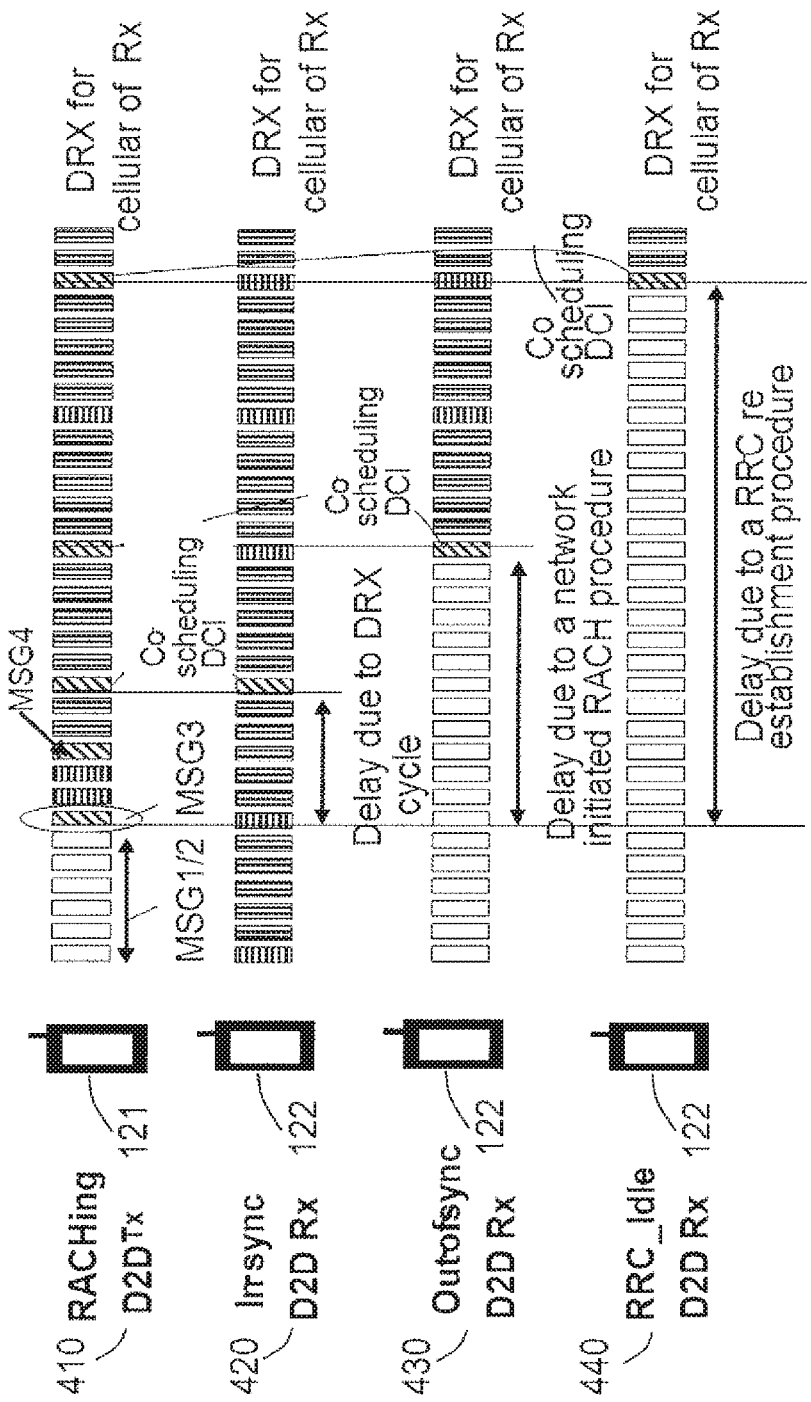
FIG. 4 is a schematic block diagram illustrating embodiments according to some scenarios.

In FIG. 4, the boxes with horizontal lines are time slots where the user equipment is active to monitor the PDCCH but there is no signalling activity, the white boxes are the time slots where the user equipment is RRC idle and the boxes with vertical lines are time slots where the user equipment is RRC connected but inactive. Boxes with upward diagonal lines are co scheduled time slots, see the co-scheduling DCI mentioned in FIG. 4 which means a PDCCH that reaches both D2D UEs, i.e. the first and the second user equipment for D2D resource scheduling. In these time slots there are signaling exchange between user equipments and the base station 110 such as e.g MSG3 and MSG4.

In a first scenario in FIG. 4, the first user equipment 121 performs RACH 410 and the second user equipment 122 is in-sync 420. When the second user equipment 122 is in-sync in the first scenario it is possible for the base station 110 to send scheduling information to both the first user equipment 121 and the second user equipment as soon as the RACH procedure is finished, if the DRX cycle of the second user equipment 122 is sufficiently short, so the traditional way still works in this case. But for another case, i.e., when the DRX cycle is long, the delay due to DRX cycle makes it hard to send scheduling information within the timer, so that the traditional way will not work in this case. It is the case shown in FIG. 4 referred to as 420, i.e., the co-scheduling DCI is sent after an individual MSG4 is sent to the first user equipment 121.

In a second scenario the first user equipment 121 performs RACH 410 and the second user equipment 122 is out-of-sync 430. In the second scenario there is an extra delay due to a network initiated RACH procedure that makes it hard to send scheduling information within the timer, so that the traditional way will not work in this case.

In a third scenario the first user equipment 121 performs RACH 410 and the second user equipment 122 is RRC idle 440. In the third scenario there is an extra delay due to RRC establishment procedure making it hard to send scheduling information within the timer, so that the traditional way will not work in this case.

So, the embodiments for sending any RACH message to be interpreted as an indication to the first user equipment 121 to stop an active time resolution timer in the first user equipment 121 are e.g. applicable in the first, second and third scenarios described above.

Note that when the second user equipment 122 is out-of-sync or in RRC idle state, the PUCCH or RRC configuration is released, so that a RRC Reconfiguration signaling, which is a RACH message, for this user equipment's C-RNTI is necessary anyway, which may thus be seen as a MSG4, i.e., to stop the ContentionResolutionTimer, as shown in FIG. 4. In FIG. 4, the timer is for 410, the timer is started at MSG3, and stopped at MSG4.

After the reception of MSG4 or any PDCCH message interpreted as MSG4, the first user equipment 121 would follow the normal DRX timing for PDCCH monitoring. Both D2D user equipments, i.e. the first user equipment 121 and the second user equipment 122 would follow the same DRX timing achieved by network configuration, the network scheduling information addressed to the D2D pair can thus reach both the first user equipment 121 and the second user equipment 122 simultaneously which is seen as "co-scheduling DCI" in FIG. 4.

This action corresponds to action 204 above.

The result of these embodiments is that they reduce user equipment power consumption for PDCCH monitoring when the timer for MSG4 is active, and they also reduce the RACH delay due to an extended length of MSG4 timer.

The RACH procedure for D2D communication according to embodiments herein is backwards compatible.

Figure 2:
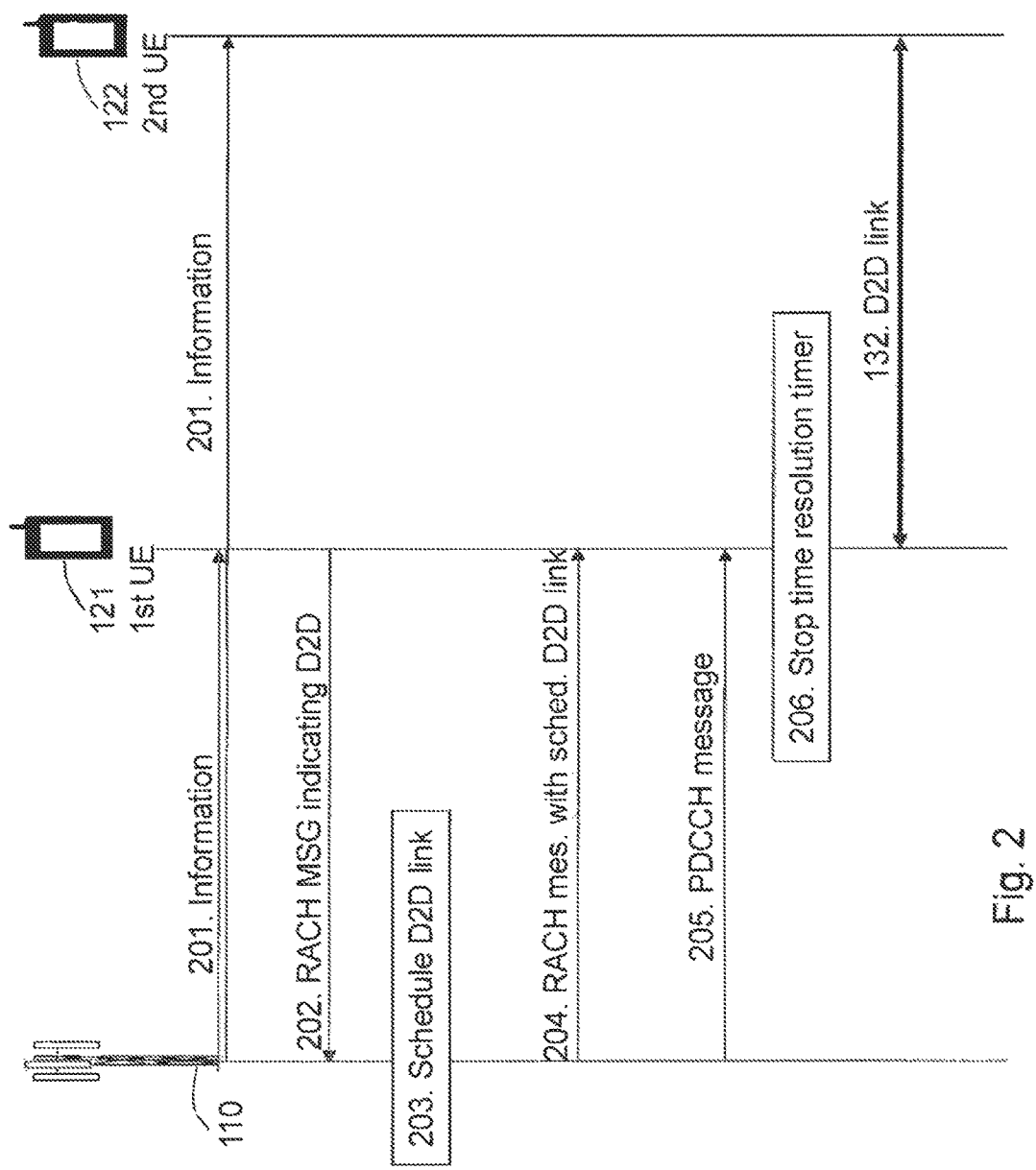
FIG. 2 is a combined flowchart and signaling diagram depicting embodiments of a method.
Figure 3:
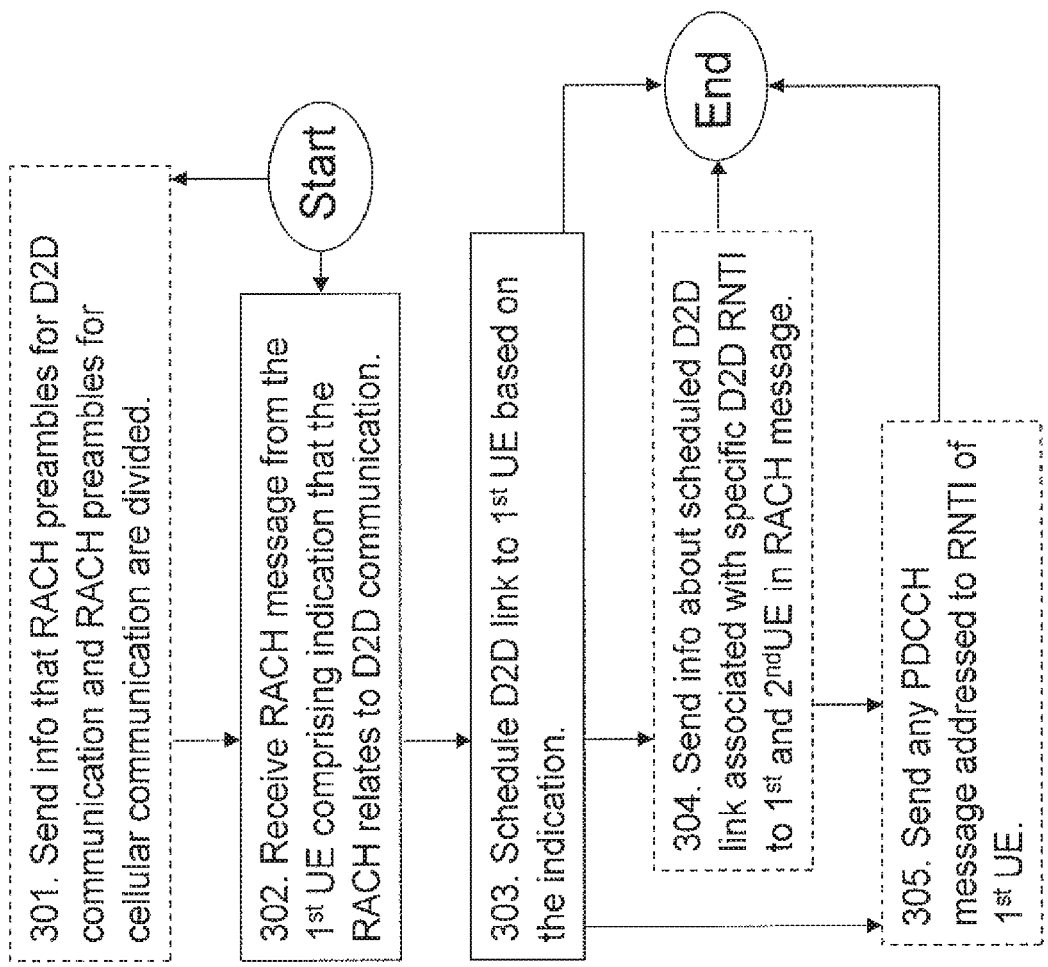
FIG. 3 is a flowchart depicting embodiments of a method in a base station.
Figure 5:
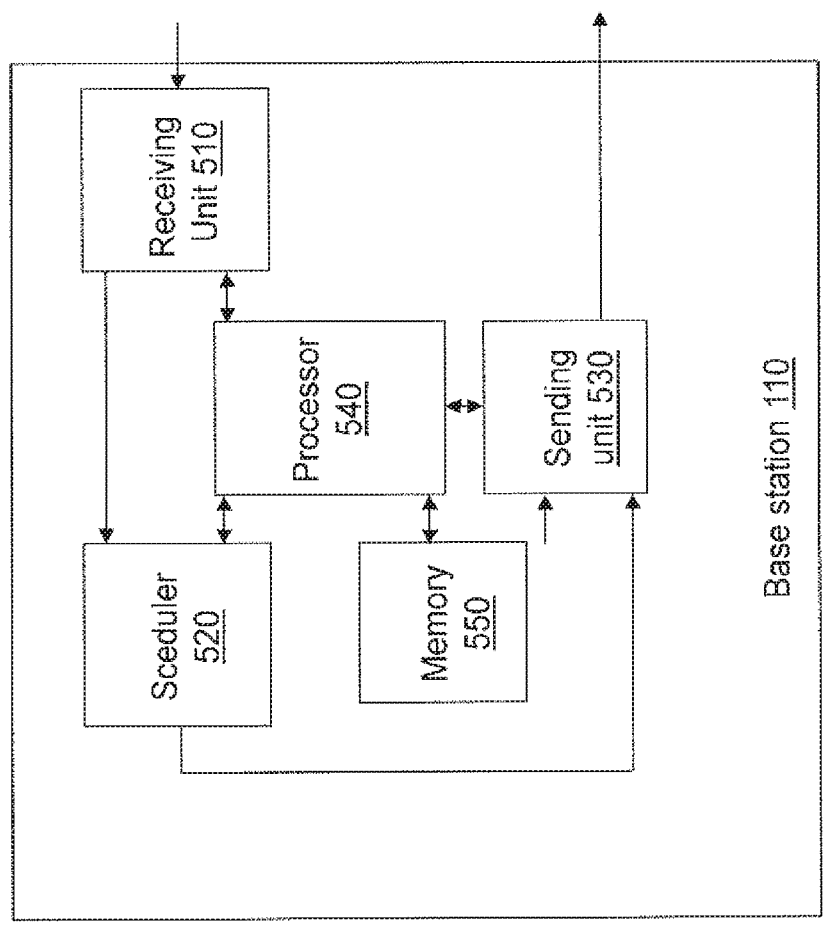
FIG. 5 is a schematic block diagram illustrating embodiments of a base station.

To perform the method actions for handling the RACH procedure in a mixed cellular and D2D network, in relation to FIGS. 2 and 3, the base station 110 comprises the following arrangement depicted in FIG. 5. As mentioned above, the D2D link may be for D2D communication between the first user equipment 121 and the second user equipment 122.

The base station 110 comprises a receiving unit 510 configured to receive a RACH message from the first user equipment 121. The RACH message comprises an indication that the RACH relates to D2D communication.

The RACH message may e.g. be a RACH preamble, or a resource request.

The indication may be a specific D2D RNTI. The specific D2D RNTI is common for transmission and reception on the D2D link.

The indication may further be a RACH preamble comprised in a group of RACH preambles relating to D2D communication or a RACH preamble received at a specific time and/or frequency location within a frame of a RACH resource, related to D2D communication.

In some embodiments the indication is a BSR comprising a format related to D2D communication.

The base station 110 further comprises a scheduler 520 configured to schedule a D2D link to the first user equipment 121 based on the indication.

The base station 110 further comprises a sending unit 530 configured to send information to the first user equipment 121 and the second user equipment 122 in a RACH message. The information comprises the scheduled D2D link associated with the specific D2D RNTI.

In some embodiments, the sending unit 530 further is configured to send information to user equipments served by the base station, which user equipments comprises the first user equipment 121. The information comprises that RACH preambles to be used for D2D communication and RACH preambles to be used for cellular communication are
- divided into different groups, a group of RACH preambles relating to D2D communication and a group of RACH preambles relating to cellular communication, or
- divided into different time and/or frequency locations within a frame of a RACH resource, a time and/or frequency location for RACH associated with D2D communication, and a time and/or frequency location for RACH associated to cellular communication.

The sending unit 530 may further be configured to send any PDCCH message to the first user equipment 121, which PDCCH message when addressing a RNTI of the first user equipment 121 will be interpreted as an indication to the first user equipment 121 to stop an active time resolution timer in the first user equipment 121.

The embodiments herein for handling the RACH procedure in a mixed cellular and D2D network may be implemented through one or more processors, such as a processor 540 in the base station 110 depicted in FIG. 5, together with computer program code for performing the functions and actions of the embodiments herein. The program code mentioned above may also be provided as a computer program product, for instance in the form of a data carrier carrying computer program code for performing the embodiments herein when being loaded into the base station 110. One such carrier may be in the form of a CD ROM disc. It is however feasible with other data carriers such as a memory stick. The computer program code may furthermore be provided as pure program code on a server and downloaded to the base station 110.

The base station 110 may further comprise a memory 550 comprises one or more memory units. The memory 550 is arranged to be used to store the indication that the RACH relates to D2D communication, data, configurations, schedulings, and applications to perform the methods herein when being executed in the base station 110.

Those skilled in the art will also appreciate that the receiving unit 510, scheduler 520, and receiving unit 510 described above may refer to a combination of analog and digital circuits, and/or one or more processors configured with software and/or firmware, e.g. stored in the memory 550, that when executed by the one or more processors such as the processor 540 perform as described above. One or more of these processors, as well as the other digital hardware, may be included in a single application-specific integrated circuitry (ASIC), or several processors and various digital hardware may be distributed among several

Embodiments of a Method Seen from a First User Equipment 121 Perspective

Figure 6:
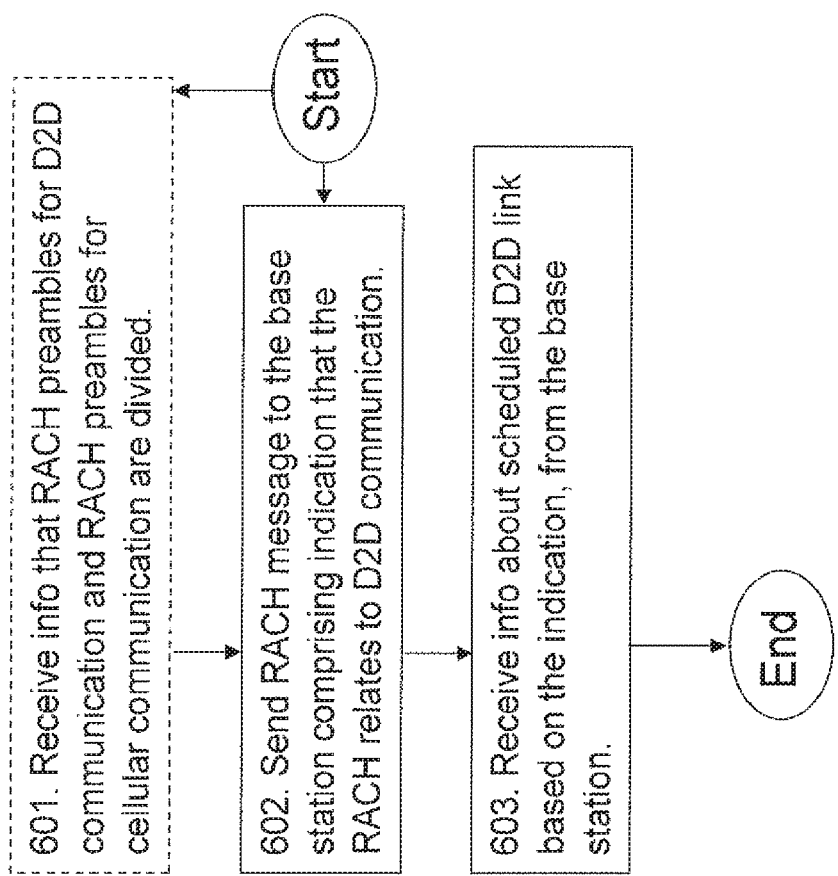
FIG. 6 is a flowchart depicting embodiments of a method in a first user equipment.

An example of embodiments of a method in the first user equipment 121 for handling a RACH procedure in the mixed cellular and D2D network 100, will now be described with reference to a flowchart depicted in FIG. 6. Since the method is very thoroughly described above in relation to FIGS. 3 and 4, it will only be briefly described in here. The method comprises the following actions, which actions may be taken in any suitable order. Dashed lines of some boxes in FIG. 6 indicate that this action is not mandatory.

Action 601

In some embodiments, the first user equipment 121 receives information from the base station 110. The information comprises that RACH preambles to be used for D2D communication and RACH preambles to be used for cellular communication are divided. In some embodiments the RACH preambles are divided into different groups, a group of RACH preambles relating to D2D communication and a group of RACH preambles relating to cellular communication. As an alternative or combined, the RACH preambles are divided into different time and/or frequency locations within a frame of a RACH resource, a time and/or frequency location for RACH associated with D2D communication, and a time and/or frequency location for RACH associated to cellular communication.

This action corresponds to action 201 above.

Action 602

The first user equipment 121 sends a RACH message to the base station 110. The RACH message comprises an indication that the RACH relates to D2D communication.

The RACH message may e.g. be a RACH preamble, or a resource request.

In some embodiments, the indication may be a specific D2D RNTI which specific D2D RNTI is common for transmission and reception on the D2D link. The D2D link is for D2D communication between the first user equipment 121 and a second user equipment 122. In these embodiments, the information about the scheduled D2D link from the base station 110 may comprise the scheduled D2D link associated with the specific D2D RNTI.

In some embodiments, the indication is a RACH preamble of a group of RACH preambles relating to D2D communication.

The indication may further be a RACH preamble sent at a specific time and/or frequency location within a frame of a RACH resource related to D2D communication.

The indication may further be a BSR comprising a format related to D2D communication.

This action corresponds to action 202 above.

Action 603

The first user equipment 121 receives information about a scheduled D2D link from the base station 110. The D2D link has been scheduled to the first user equipment 121 based on the indication. This may be a PDCCH message.

In some embodiments, the first user equipment 121 receives any PDCCH message from the base station 110. This PDCCH message, when addressed to an RNTI of the first user equipment 121, will be interpreted as an indication to the first user equipment 121 to stop an active time resolution timer in the first user equipment 121.

This action corresponds to action 204 above.

Figure 7:
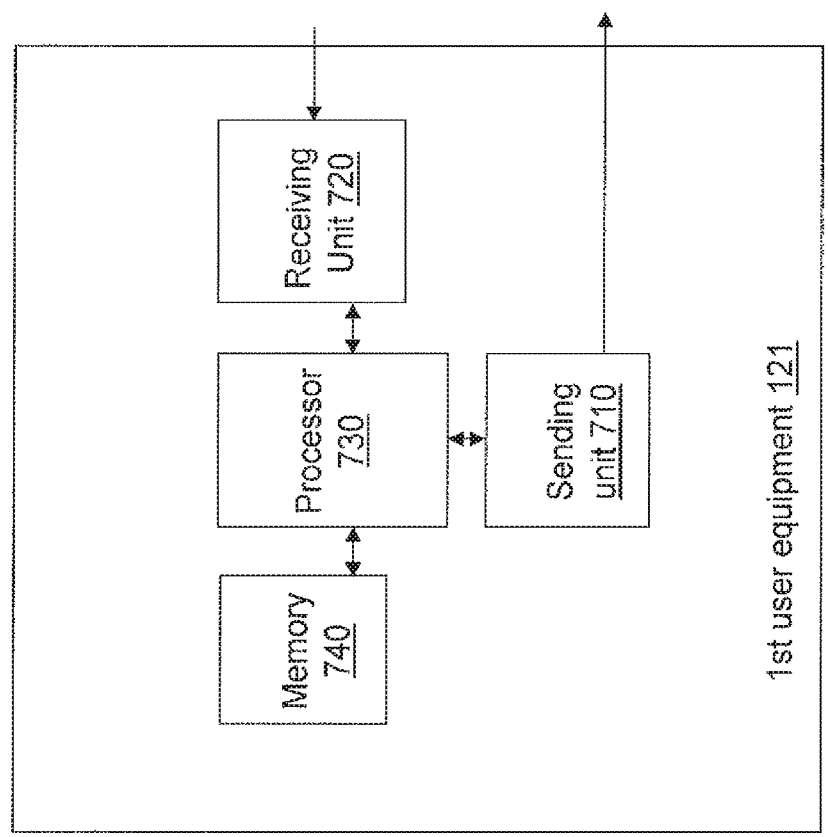
FIG. 7 is a schematic block diagram illustrating embodiments of a first user equipment.

To perform the method actions for handling Random Access Channel, RACH, procedure in a mixed cellular and D2D network described above in relation to FIG. 6, the first user equipment 121 comprises the following arrangement depicted in FIG. 7. As mentioned above and according to some embodiments, the D2D link is for D2D communication between the first user equipment 121 and the second user equipment 122.

The first user equipment 121 comprises a sending unit 710 configured to send to a base station 110 within the mixed cellular and D2D network, in a RACH message, an indication that the RACH relates to D2D communication. The RACH message may e.g. be a RACH preamble or a resource request.

In some embodiments, the indication is a specific D2D RNTI. The specific D2D RNTI is common for transmission and reception on the D2D link. The indication may further be a RACH preamble of a group of RACH preambles relating to D2D communication. In some embodiments the indication is a RACH preamble sent at a specific time and/or frequency location within a frame of a RACH resource related to D2D communication. According to some embodiments, the indication is a BSR comprising a format related to D2D communication.

The first user equipment 121 further comprises a receiving unit 720 configured to receive information about a scheduled D2D link from the base station 110, which D2D link has been scheduled to the first user equipment 121 based on the indication.

The information about the scheduled D2D link from the base station 110 may comprise the scheduled D2D link associated with the specific D2D RNTI.

The receiving unit 720 may further be configured to receive information from the base station 110. This information comprises that RACH preambles to be used for D2D communication and RACH preambles to be used for cellular communication are divided. In some embodiments the RACH preambles are divided into different groups, a group of RACH preambles relating to D2D communication and a group of RACH preambles relating to cellular communication. As an alternative or combined, the RACH preambles are divided into different time and/or frequency locations within a frame of a RACH resource, a time and/or frequency location for RACH associated with D2D communication, and a time and/or frequency location for RACH associated to cellular communication.

The receiving unit 720 may further be configured to receive any PDCCH message from the base station 110. The PDCCH message when addressed to a RNTI of the first user equipment 121, will be interpreted as an indication to the first user equipment 121 to stop an active time resolution timer in the first user equipment 121.

The embodiments herein for handling a RACH procedure in a mixed cellular and D2D network may be implemented through one or more processors, such as a processor 730 in the first user equipment 121 depicted in FIG. 7, together with computer program code for performing the functions and actions of the embodiments herein. The program code mentioned above may also be provided as a computer program product, for instance in the form of a data carrier carrying computer program code for performing the embodiments herein when being loaded into the first user equipment 121. One such carrier may be in the form of a CD ROM disc. It is however feasible with other data carriers such as a memory stick. The computer program code may furthermore be provided as pure program code on a server and downloaded to the first user equipment 121.

The first user equipment 121 may further comprise a memory 740 comprising one or more memory units. The memory 740 is arranged to be used to store e.g. the indication that the RACH relates to D2D communication, information about a scheduled D2D link, information that RACH preambles to be used for D2D communication and RACH preambles to be used for cellular communication are divided, data, configurations, schedulings, and applications to perform the methods herein when being executed in the first user equipment 121.

Those skilled in the art will also appreciate that the sending unit 710, and the receiving unit 720 described above may refer to a combination of analog and digital circuits, and/or one or more processors configured with software and/or firmware, e.g. stored in a memory such as the memory 740, that when executed by the one or more processors such as the processor 730 perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

What is claimed is:

1. A method in a base station for handling a Random Access Channel (RACH) procedure in a mixed cellular and device to device (D2D) network, the method comprising:
   receiving, from a first user equipment in a RACH message, an indication that the RACH procedure relates to a desired D2D communication, wherein the RACH message is a Msg3 message and wherein the indication comprises a D2D-specific Buffer Status Report (BSR) value of a Medium Access Control (MAC) element; and
   responsive to determining that the RACH procedure relates to the desired D2D communication based on the indication, scheduling a D2D link for the first user equipment.

2. The method of claim 1, wherein the first user equipment comprises a Long Term Evolution (LTE) capable mobile device.

3. The method of claim 1, wherein the base station comprises an eNodeB.

4. The method of claim 1, wherein the MAC element is a MAC Control Element (CE) for the D2D-specific BSR value.

5. The method of claim 1, further comprising:
   sending information to user equipment served by the base station, wherein the user equipment comprises the first user equipment, the information indicating that RACH preambles to be used for D2D communication and RACH preambles to be used for cellular communication are:
      divided into different groups, a group of RACH preambles relating to D2D communication and a group of RACH preambles relating to cellular communication, or
      divided into different time and/or frequency specific time and/or frequency locations, a time and/or frequency location for RACH associated with D2D communication, and a time and/or frequency location for RACH associated to cellular communication.

6. The method of claim 1, wherein the D2D link is for D2D communication between the first user equipment and a second user equipment, the method further comprising:
   sending information to the first user equipment and the second user equipment in a second RACH message, wherein the information comprises the scheduled D2D link.

7. The method of claim 6, wherein sending information further comprises:
   sending a Physical Downlink Control Channel (PDCCH) message to the first user equipment, wherein the PDCCH message is addressed using a Radio Network Temporary Identifier (RNTI) of the first user equipment and comprises an indication to the first user equipment to stop an active time resolution timer in the first user equipment.

8. A method in a first user equipment for handling a Random Access Channel (RACH) procedure in a mixed cellular and device to device (D2D) network, the method comprising:
   sending, to a base station within the mixed cellular and D2D network, in a RACH message, an indication that the RACH procedure relates to a desired D2D communication, wherein the RACH message is a Msg3 message and wherein the indication comprises a D2D-specific Buffer Status Report (BSR) value of a Medium Access Control (MAC) element; and
   receiving information about a scheduled D2D link from the base station, wherein the D2D link has been scheduled to the first user equipment based on the indication.

9. The method of claim 8, wherein the first user equipment comprises a Long Term Evolution (LTE) capable mobile device.

10. The method of claim 8, wherein the base station comprises an eNodeB.

11. The method of claim 8, wherein the MAC element is a MAC Control Element (CE) for the D2D-specific BSR value.

12. The method of claim 8, wherein the D2D link is for D2D communication between the first user equipment and a second user equipment, and wherein the information about the scheduled D2D link from the base station comprises the scheduled D2D link.

13. The method of claim 8, further comprising:
   receiving another information from the base station, the another information indicating that RACH preambles to be used for D2D communication and RACH preambles to be used for cellular communication are:
      divided into different groups, a group of RACH preambles relating to D2D communication and a group of RACH preambles relating to cellular communication, or
      divided into different time and/or frequency specific time and/or frequency locations, a time and/or frequency location for RACH associated with D2D communication, and a time and/or frequency location for RACH associated to cellular communication.

14. The method of claim 8, further comprising:
   receiving a Physical Downlink Control Channel (PDCCH) message from the base station, wherein the PDCCH message is addressed using a Radio Network Temporary Identifier (RNTI) of the first user equipment and comprises an indication to the first user equipment to stop an active time resolution timer in the first user equipment.

15. A base station for handling a Random Access Channel (RACH) procedure in a mixed cellular and device to device (D2D) network, the base station comprising:
  a receiving unit to receive from a first user equipment, in a RACH message, an indication that the RACH procedure relates to a desired D2D communication wherein the RACH message is a Msg3 message and wherein the indication comprises a D2D-specific Buffer Status Report (BSR) value of a Medium Access Control (MAC) element; and
  a scheduler to, responsive to a determination that the RACH procedure relates to the desired D2D communication based on the indication, schedule a D2D link for the first user equipment based on the indication.

16. The base station of claim 15, wherein the base station comprises an eNodeB.

17. The base station of claim 16, wherein the MAC element is a MAC Control Element (CE) for the D2D-specific BSR value.

18. A first user equipment for handling a Random Access Channel (RACH) procedure in a mixed cellular and device to device (D2D) network, the first user equipment comprising:
  a sending unit to send to a base station within the mixed cellular and D2D network, in a RACH message, an indication that the RACH procedure relates to a desired D2D communication, wherein the RACH message is a Msg3 message and wherein the indication comprises a D2D-specific Buffer Status Report (BSR) value of a Medium Access Control (MAC) element; and
  a receiving unit to receive information about a scheduled D2D link from the base station, wherein the D2D link has been scheduled to the first user equipment based on the indication.

19. The first user equipment of claim 18, wherein the first user equipment comprises a Long Term Evolution (LTE) capable mobile device.

20. The first user equipment of claim 18, wherein the MAC element is a MAC Control Element (CE) for the D2D-specific BSR value.

* * * * *

UNITED STATES PATENT AND TRADEMARK OFFICE
CERTIFICATE OF CORRECTION

PATENT NO. : 10,149,339 B2  
APPLICATION NO. : 15/701235  
DATED : December 4, 2018  
INVENTOR(S) : Lu et al.

Page 1 of 1

It is certified that error appears in the above-identified patent and that said Letters Patent is hereby corrected as shown below:

In the Specification

In Column 1, Line 8, delete "2015," and insert -- 2015, now Pat. No. 9,794,972, --, therefor.

In Column 3, Line 63, delete "(PDCCH)" and insert -- (PUSCH) --, therefor.

Signed and Sealed this  
Twenty-third Day of July, 2019

Andrei Iancu  
*Director of the United States Patent and Trademark Office*